United States Patent
Champlin

(10) Patent No.: US 6,637,426 B2
(45) Date of Patent: Oct. 28, 2003

(54) BARBEQUE GRILL ARRANGEMENT FOR VEHICLES

(76) Inventor: R. Stephen Champlin, P.O. Box 407, 900 E. Wabash Ave., Nappanee, IN (US) 46550-0407

( * ) Notice: Subject to any disclaimer, the term of this patent is extended or adjusted under 35 U.S.C. 154(b) by 0 days.

(21) Appl. No.: 09/730,884

(22) Filed: Dec. 7, 2000

(65) Prior Publication Data

US 2002/0069867 A1 Jun. 13, 2002

(51) Int. Cl.[7] ................................................. F24C 3/00
(52) U.S. Cl. ........................ 126/41 R; 126/276; 126/50; 126/40
(58) Field of Search ............................. 126/25 R, 41 R, 126/37, 56, 276; 248/315; 296/22

(56) References Cited

U.S. PATENT DOCUMENTS

| | | | | |
|---|---|---|---|---|
| 3,605,718 A | * | 9/1971 | Winters | 126/25 R |
| 4,347,830 A | * | 9/1982 | Runyan | 108/134 |
| 4,518,189 A | * | 5/1985 | Belt | 126/56 |
| 5,263,467 A | * | 11/1993 | Jones | 126/37 B |
| 5,310,147 A | * | 5/1994 | Billman | 248/315 |
| 5,411,011 A | * | 5/1995 | Teta | 126/41 R |
| 5,626,126 A | * | 5/1997 | McNulty | 126/25 R |
| 6,263,867 B1 | * | 7/2001 | Skelton | 126/25 R |

* cited by examiner

*Primary Examiner*—Sara Clarke
(74) *Attorney, Agent, or Firm*—Ryan M. Fountain

(57) ABSTRACT

A barbeque grill arrangement is provided having a grill unit removably mounted on a rack which attaches to an exterior vehicle wall to form a stable grill support solely by the vehicle connection. At least part of that connection can utilize a standard indoor/outdoor stove support bracket. The rack maintains all elements of the grill at least predetermined distance from the vehicle wall, sufficient to avoid heat-induced damage to the wall. The grill is connectable to the same fuel supply as is used by an interior stove. Grill heat is vented away from the vehicle. A cover stop is mounted within the cover hinge.

6 Claims, 1 Drawing Sheet

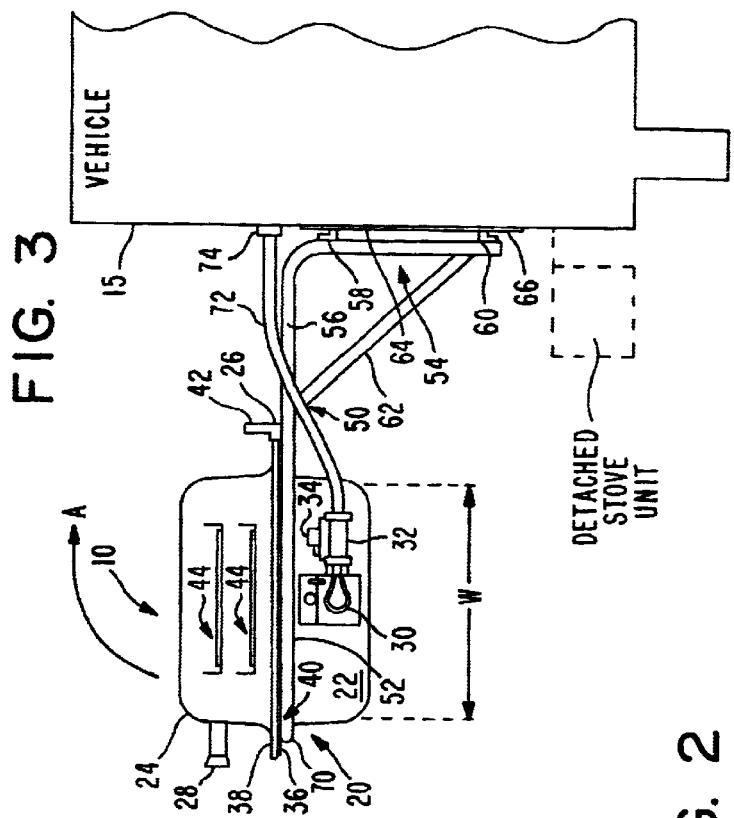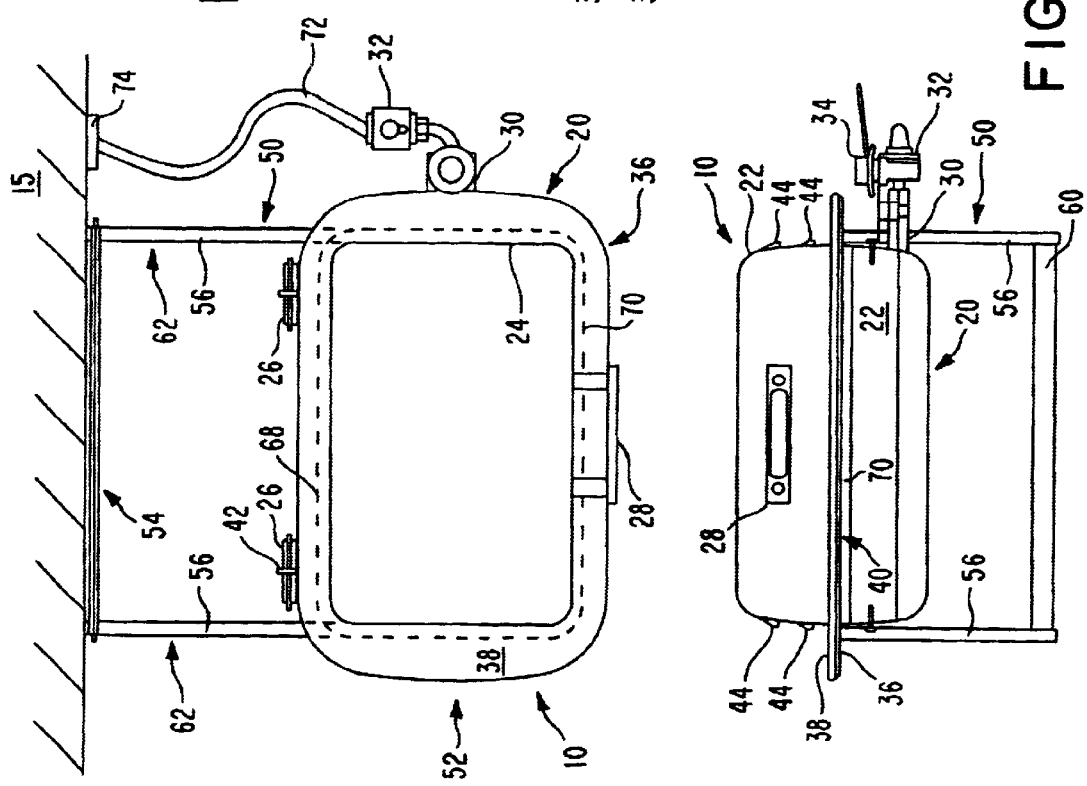

BARBEQUE GRILL ARRANGEMENT FOR VEHICLES

BACKGROUND AND SUMMARY OF THE INVENTION

The present invention relates generally to accessories for recreational vehicles, both motorized and towed, and more particularly to cooking accessories that are removably mounted to the exterior of the recreational vehicle.

Recreational vehicles, including travel trailers, motor homes and the like, typically have facilities within them, such as stoves, for cooking food. The fuel for such stoves is often bottled fluid or gas, such as propane, which is stored in containers within the vehicle or stored on the exterior of the vehicle with fuel supply lines running to the stove location interior of the vehicle from the containers. Cooking on such stoves is in many ways similar to cooking on common residential gas stoves.

Persons using recreational vehicles have also often used barbeque grills for cooking food outside the vehicle when camping or picnicking. Cooking food on a barbeque grill outside of the vehicle has certain advantages over cooking on the inside stove from the standpoint of safety (less risk of fire spreading to the vehicle), cleanliness (less contamination of the vehicle interior with food odors), comfort (less heating of the vehicle interior in warm weather use) and food taste (easier to apply certain smoked or grilled flavors). On the other hand, a barbeque grill is typically harder to clean, especially where charcoal fuel has been used. Such grills are commonly portable, light weight and free standing and, therefore, require careful attention to the actions of persons or pets in its vicinity to avoid inadvertent contact which could tip it over or cause burn injuries. Further, such grills typically produce a significantly greater amount of heat and possibly residual heat when cooking is completed, especially when using charcoal. Thus, the grills may need to be placed in a safe spot spaced away from the vehicle and areas of high activity, but further from the convenience of the vehicle dining and storage facilities. Further, prior barbeque grill use has often required the use of a second fuel supply, additional propane gas containers or bags of charcoal, for example.

It has been suggested to offset some of the disadvantages of purely interior cooking facilities in recreational vehicles by making the stoves portable and adaptable for use inside or outside of the vehicle. Such indoor/outdoor stoves typically include a lightweight mounting frame, formed from plastic material, for example, that attaches either to an interior shelf or support recess, or to a bracket on an exterior wall of the vehicle. During exterior use, the stove is adjacent and cantilevered from that exterior wall, and a fuel supply line is attachable to the stove to connect it to the same fuel supply as used when the stove is on the interior of the vehicle. Such stoves in exterior use have the advantages of freeing up interior space, keeping the cooking heat and odors outside of the vehicle, and minimizing fuel supply sources while maintaining a convenient proximity to the vehicle dining and storage areas.

Unfortunately, such stoves have not been able to provide the high temperatures and flavor enhancing capabilities of barbeque grills without at least including cumbersome, expensive and/or bulky modifications, shielding and accessory devices. Without such shielding, for example, the adjacent exterior wall of the vehicle can be damaged by the barbeque-like heat generated in normal grilling. Similarly, if an accessory cover, for example, were to be placed over the stove to simulate to heat retaining covers on barbeque grills, the cover would become significantly heated during use. If the cover is hinged to the stove to open away from users in order to safely support it in the manner of barbeque covers, the opened cover could be directly in contact or near contact with the vehicle exterior wall. The heat of the cover thus could cause substantial damage to that wall even after the stove has been turned off. If the cover is not connected to the stove, then another heat resistant support must be provide for it when removed from the stove. Likewise, the plastic mounting frame of many such prior stoves would itself not withstand the high temperatures of barbeque-like cooking. Creation of a more heat durable frame would entail greater expense, bulk and/or weight. In addition, since barbeque-like grilling often produces greater mess deposited onto the cooking equipment, such stoves would have to be designed to permit greater ease of cleaning and durability of components regularly in contact with users during cleaning. Finally, if such stoves are "bulked-up" to permit use as a grill, supplemental ground-engaging supports may be needed to ensure a stable cooking platform, and such supports could present a hazard to movement by persons and/or pets in the vicinity.

Accordingly, it is an object of the present invention to provide improved cooking facilities for use with recreational vehicles. Other objects include the use of a portable barbeque cooking device which is:

a. inexpensive, lightweight and reliable over repeated use, b. removably attachable to the exterior of a vehicle and provides a stable cooking platform adjacent thereto without significant risk of damage to the vehicle, c. compact and easily installed and removed from the vehicle, d. easily cleaned and serviced, and e. able to utilize mounting component commonality with standard indoor/outdoor recreational vehicle stoves.

These and other objects of the present invention are attained by the provision of a barbeque grill arrangement having a grill unit removably mounted on a rack which attaches to an exterior vehicle wall to form a stable grill support solely by the vehicle connection. At least part of that connection can utilize a standard indoor/outdoor stove support bracket. The rack maintains all elements of the grill at least predetermined distance from the vehicle wall, sufficient to avoid heat-induced damage to the wall. The grill is connectable to the same fuel supply as is used by an interior stove. Grill heat is vented away from the vehicle. A cover stop is mounted within the cover hinge.

Other objects, advantages and novel features of the present invention will become readily apparent from the following drawings and detailed description of preferred embodiments.

BRIEF DESCRIPTION OF THE DRAWINGS

FIG. 1 shows a top view of a barbeque grill arrangement incorporating the present invention.

FIG. 2 shows a front view of the barbeque grill arrangement of FIG. 1.

FIG. 3 shows a side view of the barbeque grill arrangement of FIG. 1.

DETAILED DESCRIPTION OF PREFERRED EMBODIMENTS

A barbeque grill arrangement 10 according to a preferred embodiment of the present invention is shown in FIGS. 1–3.

This arrangement includes a grill unit 20 and a rack 50 mounted to exterior wall 15 of an exemplary vehicle, such as a truck camper, tent camper trailer, travel trailer, motor home or the like. This vehicle includes, for example, a conventional interior stove and an interior fuel supply for that stove. In preferred embodiments the vehicle stove is of the indoor/outdoor type and a conventional connection to the fuel supply is provided through wall 15 for the stove to connect to when in an outdoor use mode.

Grill unit 20 includes a base portion 22 and a cover portion 24. A pair of spaced apart hinges 26 is mounted at the rear of base portion 22 and cover portion 24 to allow those members to be pivotably movable with respect to each other. As shown in the figures, cover portion 24 is closed onto base portion 22 to create a cooking enclosure therebetween. It will be readily understood that cover portion 24 is pivotable about hinges 26 in the direction of arrow A to move rearwardly to an open position, allowing access to the interior of the grill unit for cooking. A handle 28 is preferably mounted to the front of cover portion 24 to facilitate the pivoting of opening and closing.

While a variety of different fuel sources are contemplated by the present invention, it is preferred that gas fuel, such as propane, be employed. Accordingly, the interior of grill unit 10 includes a conventional flame spreader and food supporting wire grate, consistent with the nature of the fuel used in a given embodiment. Similarly, a conventional burner 30, fuel valve regulator assembly 32 and control knob 34 are supplied to base portion 22, consistent with the nature of the fuel used.

Base portion 22 is formed with a peripheral ledge or flange 36. Cover portion 24 is formed with a peripheral ledge or flange 38. In preferred embodiments, flange 38 is formed to closely fit over flange 36 when cover portion 24 is closed upon base portion 22. It is also preferable that hinges 26 are attached to base portion 22 at flange 36 and to cover portion 24 at flange 38. Flange 36 is further preferably formed with a curved or shaped underportion 40, at least along the front of base portion 22.

At least one hinge 26 can include, for example, a stop member or arm 42 to limit the reward pivotal movement of cover portion 24 when it is opened. Preferably, arm 42 is formed as a generally vertical extension against which cover portion 24 can rest in the fully opened position without falling back to a closed position. Arm 42 is preferably formed such that cover portion 24 is restricted from moving rearwardly toward wall 15 past a predetermined point, that point being determined by the limit of proximity to wall 15 which would risk significant damage to wall 15 from the heat of cover portion 24 during normal use. That distance can be readily determined by knowledge of the material from which wall 15 is constructed and the typical temperature of barbequing with a given fuel source.

To aid in dissipation of grill heat away from wall 15, vents 44 are provided in cover portion 24. Vents 44 are preferably formed so as to direct heat downwardly, away from wall 15, from the sides of cover portion 24, and away from the typical user position at the front of grill unit 20.

Rack 50 is preferably formed as a frame to removably receive grill unit 10 and securely support it on the vehicle at a predetermined distance from wall 15. That distance is also readily determined by reference to the material used to form wall 15 and the typical temperature of barbequing so as to avoid any significant risk of heat damage to wall 15. In preferred embodiments, for example, where the fuel source is propane and the vehicle employs a vinyl or plastic exterior siding on wall 15, the distance may be approximately the same as the width W of base portion 22.

Rack 50 includes a first portion 52 for receiving grill unit 10 and a second portion 54 for securely engaging wall 15. In preferred embodiments, portions 52 and 54 are integrally formed from a single, bent tubular or shaped member 56. Cross braces 58 and 60 are connected across the free ends of member 56 in portion 54. Reinforcing struts 62 can be disposed at the vertical bends of member 56 to assist in shape retention and/or prevent downward migration of grill unit 10. Cross braces 58 and 60 are formed to be matingly and removably received by vertically spaced brackets 64 and 66 that are, for example, permanently mounted onto wall 15.

In preferred embodiments, one of brackets 64 or 66, and more likely bracket 64, is formed as a conventional support bracket for an indoor/outdoor stove. Thus, the number of bracket fittings needed on the vehicle can be minimized. The other or supplemental of the brackets can also be conventionally formed, the objective being to allow rack 50 to be easily slid or turned into place on wall 15 and yet permit a minimum of movement, flex or "jiggling" to grill unit 10 as a result of use of the vehicle and/or the grill unit.

To positively locate grill unit 10 within rack 50, underportion 40 is, for example, shaped so as to matingly receive the forward portion 70 of member 56 and thereby restrict forward or rearward sliding of base portion 22. In other embodiments, forward portion 70 of member 56 can closely engage the forward, lower portion of base member 22, and a cross bar 68 can be connected to bridge member 56 immediately rearward of the back of base portion 22.

In use, rack 50 is, for example, first mounted to wall 15 via brackets 64 and 66, then grill unit 10 is inserted into rack 50, and then a conventional fuel supply line 72 is removably attached to a fuel source. Preferably, supply line 72 connects to the same interior fuel supply 76 as is used by the interior stove of the vehicle. Where the vehicle has an indoor/outdoor type stove, supply line 72 can connect to the same conventional fuel supply fittings 74 passing through wall 15 that the stove uses in its outdoor mode. After use, grill unit 10 can be removed from rack 50 for separate cleaning and/or storage.

While the present invention has been described and illustrated above with respect to certain preferred embodiments, that is by way of illustration and example only, and not as a limitation of the scope of the invention. Those of ordinary skill in the art will now understand that numerous modifications can be made without departing from the present invention. For example, a principle advantage of the present invention is that the entire unit is supported by the vehicle, without ground engagement that may obstruct user movement. In embodiments where rack 50 and grill unit 10 are integrally formed in whole or part and not separable, struts 62 can be used to instead removably bridge from grill unit 10 directly to wall 15. Alternatively, rack 50 can be hingedly fixed to wall 15 and only grill unit 10 removable for cleaning and/or storage. Thus, the spirit and scope of the present invention are limited only by the terms of the following claims.

What is claimed is:

1. A barbeque grill arrangement for alternative use with a vehicle having an exterior, gas-fueled stove unit removably mountable to an exterior wall of the vehicle via a bracket fixed on that exterior wall and supplied with gas fuel via a dismountable connection through the exterior wall of the vehicle to a supply of gas fuel on the interior of the vehicle, the grill arrangement comprising:

a grill unit, a rack having a first portion for removably receiving the grill unit and supporting it cantilevered from the exterior wall of the vehicle, and a second portion for releasably attaching the rack to the bracket, and the first portion being spaced apart from the second portion by a distance sufficient to prevent the heat generated by the barbeque from having a significant adverse impact upon the exterior wall of the vehicle.

2. The barbeque grill arrangement according to claim 1 wherein the spacing between the first portion and the second portion is approximately the same as the corresponding dimension of the grill unit, and a supplemental bracket is provided on the exterior wall for releasable attachment to the second portion of the rack at a location spaced apart from the location of the bracket used by the stove unit.

3. The barbeque grill arrangement according to claim 2 wherein the grill unit includes a base portion and a cover portion which is joined to the base portion by a hinge, the hinge including a stop member that restricts motion of the cover portion toward the exterior wall of the vehicle past a predetermined point.

4. The barbeque grill arrangement according to claim 3 wherein the grill unit includes a fuel supply means for mounting it to the same connection through the exterior wall as used by the stove unit to obtain access to the supply of gas fuel on the interior of the vehicle.

5. A barbeque grill arrangement, adapted for use on a vehicle, comprising:

a grill unit, a rack with a first portion for receiving the grill unit and a second portion for engaging the vehicle, the first portion being spaced apart from the second portion by a distance sufficient to prevent the heat generated during use of the grill unit from adversely affecting the vehicle, and wherein the grill unit includes a means for venting heat in a direction away from the vehicle.

6. The barbeque grill arrangement according to claim 5 in combination with a vehicle, wherein the vehicle includes a gas-fueled stove unit and common connection means are provided for connecting the grill unit to the supply of gas fuel used by the stove unit.

* * * * *